(12) United States Patent
Huang et al.

(10) Patent No.: US 11,218,993 B2
(45) Date of Patent: Jan. 4, 2022

(54) SERVICE REQUEST PRIORITIZATION FOR INTRA-UE SERVICE MULTIPLEXING

(71) Applicant: QUALCOMM Incorporated, San Diego, CA (US)

(72) Inventors: Yi Huang, San Diego, CA (US); Linhai He, San Diego, CA (US); Wanshi Chen, San Diego, CA (US); Wei Yang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/453,851

(22) Filed: Jun. 26, 2019

(65) Prior Publication Data
US 2020/0008177 A1 Jan. 2, 2020

Related U.S. Application Data

(60) Provisional application No. 62/692,630, filed on Jun. 29, 2018.

(51) Int. Cl.
*H04W 72/02* (2009.01)
*H04L 5/00* (2006.01)
(Continued)

(52) U.S. Cl.
CPC .......... *H04W 72/02* (2013.01); *H04L 5/0053* (2013.01); *H04W 72/0406* (2013.01); *H04W 72/1242* (2013.01)

(58) Field of Classification Search
CPC .... H04L 5/0053; H04W 72/02; H04W 72/12; H04W 72/1242; H04W 72/0406
See application file for complete search history.

(56) References Cited

U.S. PATENT DOCUMENTS

2014/0293898 A1* 10/2014 Tseng .................... H04W 24/04
370/329
2015/0117342 A1* 4/2015 Loehr ............... H04W 72/1284
370/329
(Continued)

FOREIGN PATENT DOCUMENTS

EP 3340572 A1 6/2018
JP 2017-176818 * 9/2017 ............... H04B 1/76

OTHER PUBLICATIONS

Huawei, et al., "Intra-UE UL Multiplexing Between eMBB and URLLC", 3GPP TSG RAN1 WG1 Meeting #93, 3GPP Draft; R1-1805899, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018, May 20, 2018 (May 20, 2018), 6 Pages, XP051441118, Retrieved from the Internet: URL: http://www.3gpp.org/ftp/Meetings_3GPP_SYNC/RAN1/Docs/[retrieved on May 20, 2018], Sections 1-3.
(Continued)

*Primary Examiner* — Kevin C. Harper
(74) *Attorney, Agent, or Firm* — Patterson + Sheridan, LLP

(57) ABSTRACT

Certain aspects of the present disclosure provide techniques for service request (SR) prioritization for intra-UE (user equipment) ultra-reliable low-latency communication (URLLC) service and enhanced mobile broadband (eMBB) service multiplexing. Aspects provide a method for wireless communications by a UE. The method includes determining one or more transmission resources for one or more service requests (SRs) for a first type of service and/or a second type of service. The method includes determining one or more priority levels associated with the one or more transmission resources. The method includes transmitting the one or more
(Continued)

SRs using the determined one or more transmission resources based on the associated priority levels.

26 Claims, 7 Drawing Sheets

(51) Int. Cl.
*H04W 72/12* (2009.01)
*H04W 72/04* (2009.01)

(56) References Cited

U.S. PATENT DOCUMENTS

| | | | |
|---|---|---|---|
| 2018/0227949 A1* | 8/2018 | Tiirola | H04W 74/04 |
| 2018/0324787 A1* | 11/2018 | Yin | H04L 1/1861 |
| 2018/0368173 A1* | 12/2018 | Shaheen | H04W 72/1289 |
| 2020/0178282 A1* | 6/2020 | Yi | H04W 72/1247 |
| 2020/0280427 A1* | 9/2020 | Liu | H04W 72/04 |
| 2021/0243784 A1* | 8/2021 | Goto | H04W 72/1247 |

OTHER PUBLICATIONS

Huawei, et al.,"LCP Priority and Procedure", 3GPP TSG RAN2 Meeting #99, 3GPP Draft; R2-1710372 LCP Priority and Procedure in NR, 3rd Generation Partnership Project (3GPP), Mobile Competence Centre, 650, Route Des Lucioles ; F-06921 Sophia-Antipolis Cedex, France, vol. RAN WG2, No. Prague, Czech Republic; Oct. 9, 2017-Oct. 13, 2017, Oct. 8, 2017 (Oct. 8, 2015), 5 Pages, XP051342419, Retrieved from the Internet: URL: https://www.3gpp.org/ftp/Meetings_3GPP_SYNC/RAN2/Docs/. [retrieved Oct. 8, 2017], Sections 1-3.
International Search Report and Written Opinion—PCT/US2019/039534—ISA/EPO—Sep. 11, 2019.

* cited by examiner

SERVICE REQUEST PRIORITIZATION FOR INTRA-UE SERVICE MULTIPLEXING

CROSS-REFERENCE TO RELATED APPLICATION(S)

This application claims benefit of and priority to U.S. Provisional Patent Application Ser. No. 62/692,630, filed Jun. 29, 2018, herein incorporated by reference in its entirety as if fully set forth below and for all applicable purposes.

BACKGROUND

Field of the Disclosure

Aspects of the present disclosure relate to wireless communications, and more particularly, to techniques for service request (SR) prioritization for intra-UE (user equipment) service multiplexing.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure are related to service request (SR) prioritization for intra-UE (user equipment) service multiplexing Certain aspects provide a method for wireless communication by a UE. The method generally includes determining one or more transmission resources for one or more SRs for at least one of: a first type of service or a second type of service. The method generally includes determining one or more priority levels associated with the one or more transmission resources. The method generally includes transmitting the one or more SRs using the determined one or more transmission resources based on the associated priority levels.

Certain aspects provide a method for wireless communication by a base station (BS). The method generally includes determining one or more priority levels of one or more logical channels (LCHs) associated with one or more SRs for at least one of: a first type of service or a second type of service. The method generally includes sending radio resource control (RRC) signaling to a UE indicating the one or more priority levels of the one or more LCHs.

Certain aspects provide an apparatus for wireless communication. The apparatus generally includes means for determining one or more transmission resources for one or more SRs for at least one of: a first type of service or a second type of service. The apparatus generally includes mean for determining one or more priority levels associated with the one or more transmission resources. The apparatus generally includes means for transmitting the one or more SRs using the determined one or more transmission resources based on the associated priority levels.

Certain aspects provide an apparatus for wireless communication. The apparatus generally includes means for determining one or more priority levels of one or more LCHs associated with one or more SRs for at least one of: a first type of service or a second type of service. The apparatus generally includes means for sending RRC signaling to a UE indicating the one or more priority levels of the one or more LCHs.

Certain aspects provide an apparatus for wireless communication. The apparatus generally includes a memory and at least one processor coupled with the memory. The at least one processor is configured to determine one or more transmission resources for one or more SRs for at least one of: a first type of service or a second type of service; determine one or more priority levels associated with the one or more transmission resources; and transmit the one or more SRs using the determined one or more transmission resources based on the associated priority levels.

Certain aspects provide an apparatus for wireless communication. The apparatus generally includes a memory and at least one processor coupled with the memory. The at least one processor is configured to determine one or more priority levels of one or more LCHs associated with one or more SRs for at least one of: a first type of service or a second type of service; and send RRC signaling to a UE indicating the one or more priority levels of the one or more LCHs.

Certain aspects provide a computer readable medium storing computer executable code thereon for wireless communication. The computer readable medium generally includes code for determining one or more transmission resources for one or more SRs for at least one of: a first type of service or a second type of service. The computer readable medium generally includes code for determining one or more priority levels associated with the one or more transmission resources. The computer readable medium generally includes code for transmitting the one or more SRs using the determined one or more transmission resources based on the associated priority levels.

Certain aspects provide a computer readable medium storing computer executable code thereon for wireless communication. The computer readable medium generally includes code for determining one or more priority levels of one or more LCHs associated with one or more SRs for at least one of: a first type of service or a second type of service. The computer readable medium generally includes code for sending RRC signaling to a UE indicating the one or more priority levels of the one or more LCHs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for service request (SR) prioritization for various services supported by a user equipment (UE).

New radio access (e.g., 5G NR technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Various services may be multiplexed at the UE. The different services may be associated with logical channels (LCHs) at the UE medium access control (MAC) layer. The LCHs may be mapped to SR configurations. The SR configurations are mapped to physical layer (PHY) transmission resources for the SRs. In some cases, other channels/signals may collide with SR transmission resources.

Accordingly, aspects of the present disclosure provide techniques and apparatus for the UE to determine priority levels for the SR transmission resources and perform collision handling based on the prioritization of the SRs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Figure 1:
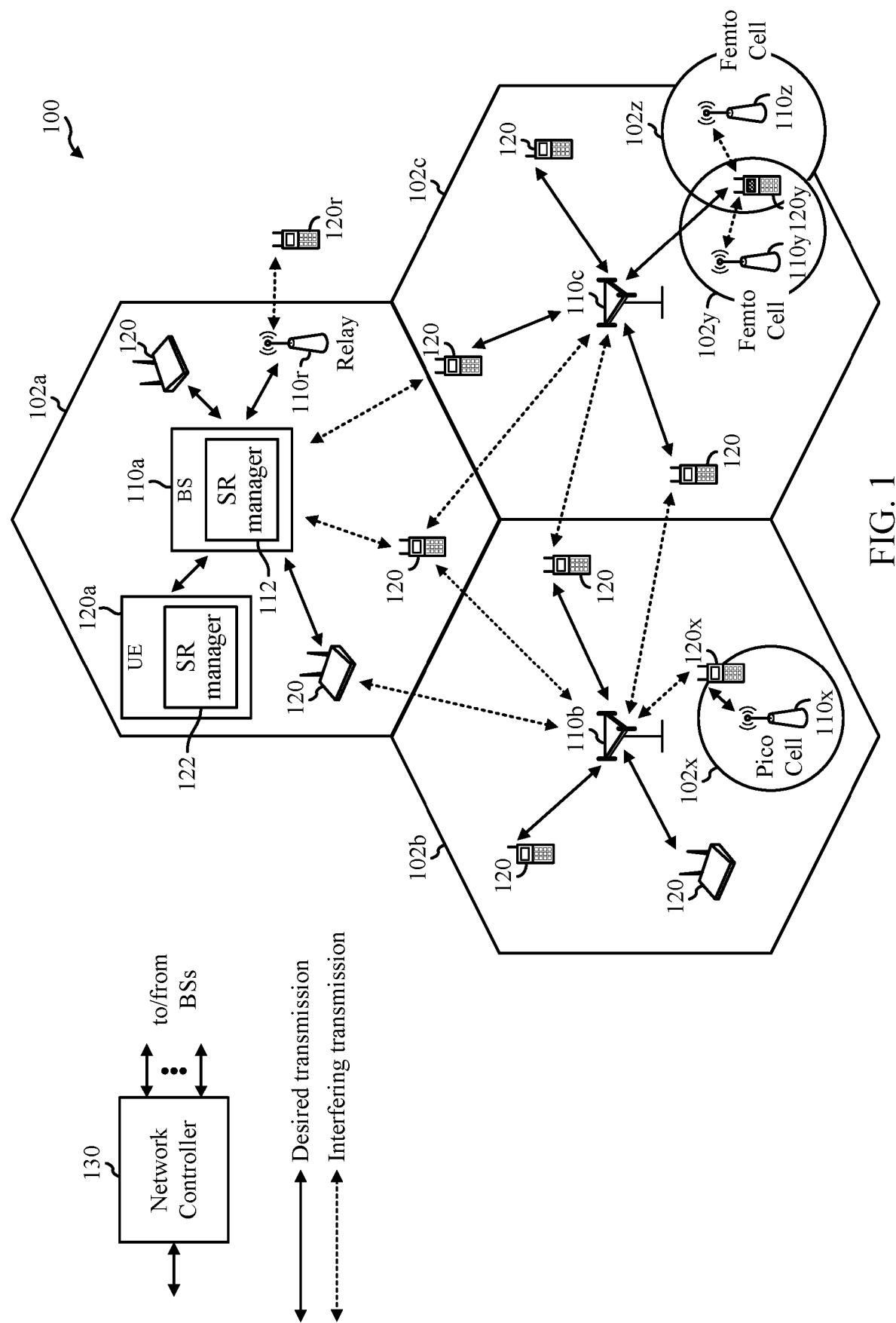
FIG. 1 is a block diagram conceptually illustrating an example telecommunications system, in accordance with certain aspects of the present disclosure.

FIG. 1 illustrates an example wireless communication network 100 in which aspects of the present disclosure may be performed for service request (SR) prioritization for intra-UE service multiplexing. In some examples, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", may be stationary or may move according to the location of a mobile BS 110. In some examples, the BSs 110 may be interconnected to one another and/or to one or more other base stations or network nodes (not shown) in wireless communication network 100 through various types of backhaul interfaces (e.g., a direct physical connection, a wireless connection, a virtual network, or the like) using any suitable transport network.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

A UE 120a in the wireless communication network 100 may be configured for multiple services, such as URLLC and eMBB service. As shown in FIG. 1, the UE 120a may have an SR manager 122. The SR manager 122 may be configured to determine transmission resources for SRs for a first type of service (e.g., URLLC) and/or a second type of service (e.g., eMBB), in accordance with aspects of the present disclosure. The SR manager 122 may be configured to determine priority levels associated with the transmission resources and transmit SRs for the first and/or second type of service using the determined transmission resources for the SR based on the associated priority level, in accordance with aspects of the present disclosure. In some examples, the UE 120a may handle collisions with other signals based on the priority of the SR. As shown in FIG. 1, the BS 110a may have an SR manager 112. The SR manager 112 may be configured to determine priority levels of LCHs associated with SRs for a first and/or second type of service, in accordance with aspects of the present disclosure. The SR manager 112 may be configured to send radio resource control (RRC) signaling to the UE 120a indicating the priority levels of the LCHs.

Wireless communication network 100 may also include relay stations (e.g., relay station 110r), also referred to as relays or the like, that receives a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

A service request (SR), or scheduling request, is sent by a UE to request a grant from the network (e.g., a BS) for resources associated with a transmission for the particular service.

Figure 2:
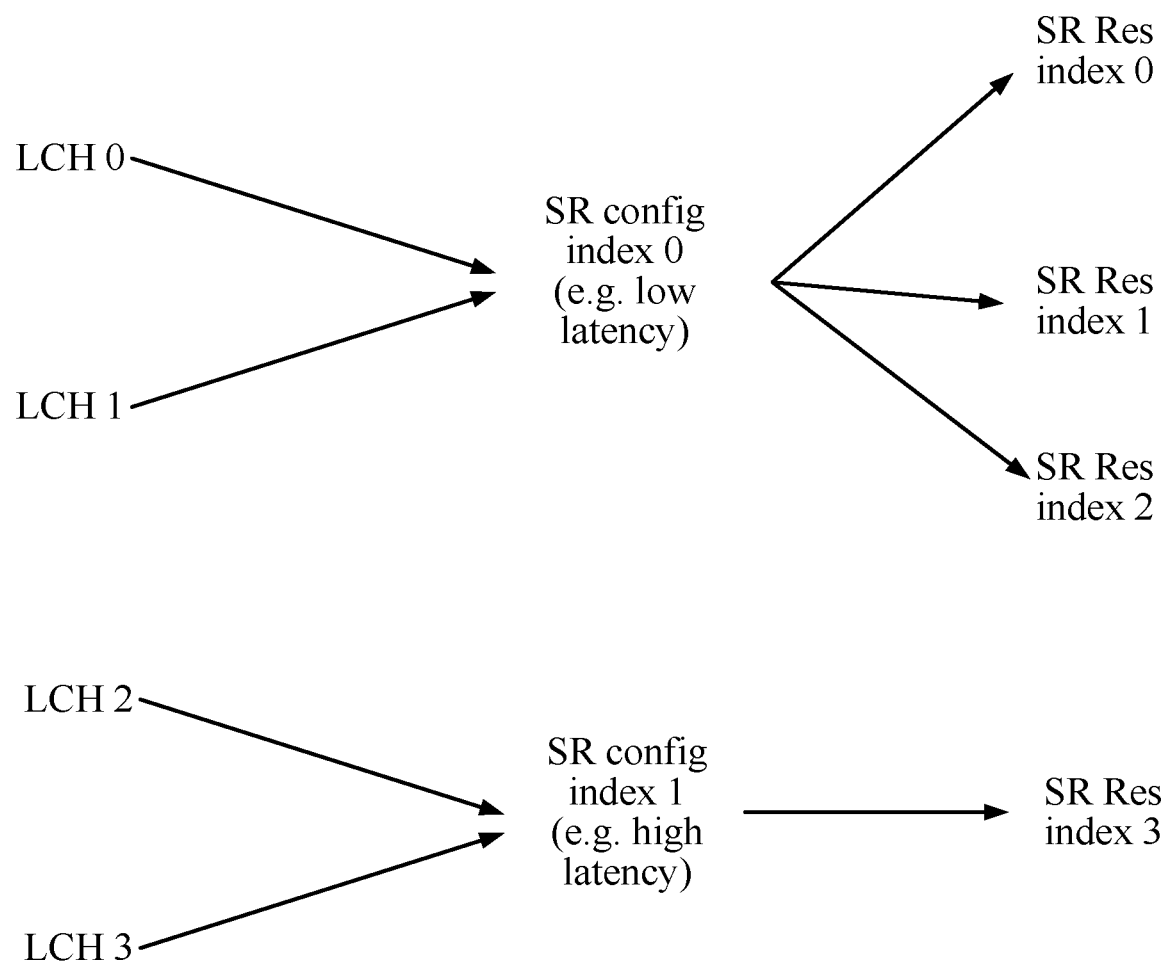
FIG. 2 shows an example mapping of logical channels to configuration indices and of the configuration indices to physical resources, in accordance with certain aspects of the present disclosure.

At the MAC layer, the different types of services may be associated with various LCHs. Each LCH is mapped to a configuration. In some examples, LCHs are mapped to a SR configurations. The SR configurations may have identifiers, such as an index. FIG. 2 illustrates an example mapping of LCHs (LCHs 0, 1, 2, 3) to SR configuration indices (SR configuration index 0, SR configuration index 1). Multiple LCHs can be mapped to the same configuration index, however, no LCH is mapped to more than configuration. As shown in FIG. 2, LCH 0 and LCH 1 are both mapped only to the SR configuration index 0 and the LCH 2 and LCH 3 are mapped only to the SR configuration index 1. The different configurations may be based on various transmission parameters, such as the type of service, latency requirements, etc. Thus, the particular configuration used for transmitting a SR to the network can indicate the class of service for which a grant is requested, and the BS can schedule the resources accordingly (e.g., the BS may schedule more resources for URLLC than for eMBB). As shown in the example in FIG. 2, the SR configuration index 0 is with low latency transmission and the SR configuration index 1 is associated with high latency transmission.

The configurations may be mapped to physical layer (PHY) resources. The PHY resources may define the sequence, frequency, time, and/or spatial resources available for SR transmission. Each configuration may be mapped to multiple PHY resources, however, no two configurations are mapped to the same PHY resource. As shown in the example in FIG. 2, the SR configuration index 0 is mapped to PHY SR resources 0, 1, and 2, and the SR configuration index 1 is mapped to PHY SR resource 3. In some examples, the configuration for URLLC may be mapped to more resources than eMBB, for example, in order to ensure the lower latency and higher reliability requirements for URLLC service. Further, by not mapping multiple configurations to the same PHY resource, the network can identify the type of service class associated with the SR to schedule accordingly. In some examples, the mapping of the configurations to the PHY resources may be provided to the UE by the network. For example, the mapping may be indicated via RRC signaling from the BS.

Figure 3:
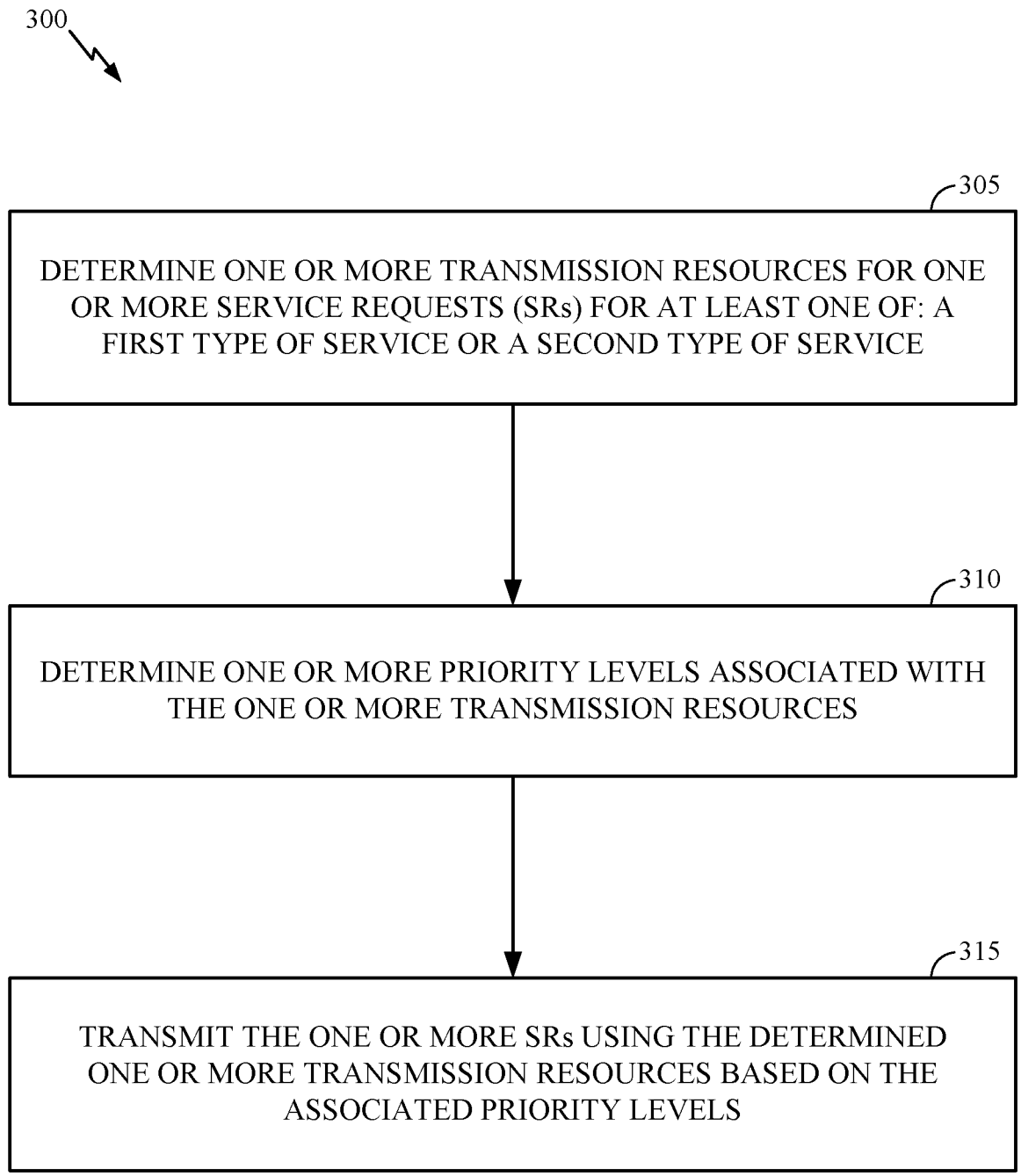
FIG. 3 is a flow diagram illustrating example operations for wireless communication by a user equipment (UE), in accordance with certain aspects of the present disclosure.

FIG. 3 is a flow chart illustrating example operations 300 for wireless communications, in accordance with certain aspects of the present disclosure. The operations 300 may be performed, for example, by a UE (e.g., such as the UE 120a in the wireless communication network 100). Operations 300 may be implemented as software components that are executed and run on one or more processors (e.g., controller/processor 780 of FIG. 7). Further, the transmission and reception of signals by the UE in operations 300 may be enabled, for example, by one or more antennas (e.g., antennas 752 of FIG. 7). In certain aspects, the transmission and/or reception of signals by the UE may be implemented via a bus interface of one or more processors (e.g., controller/processor 780) obtaining and/or outputting signals.

Operations 300 may begin, at 305, by determining one or more transmission resources for one or more SRs for at least one of: a first type of service or a second type of service. The first and second type of service may be different types, such as different service classes. The first type of service may be a low latency service and the second type of service may be a high latency type of service. In some examples, the first type of service is URLLC and the second type of service is eMBB. In some examples, the priority is determined at the UE PHY layer.

The determination of the transmission resources may be performed as described above with respect to FIG. 2. For example, the UE may determine a mapping of one or more MAC layer LCHs to one or more SR configuration indices. In some examples, each MAC layer LCH maps to only one SR configuration index, but different MAC layer LCHs may be mapped to the same SR configuration. The mapping may be based on the type of service associated with the LCH. The UE may determine a mapping of the one or more SR configuration indices to one or more PHY transmission resources. For example, each SR configuration can be mapped to multiple SR PHY resources, but no two SR configurations indices are mapped to the same PHY resource. The UE may receive RRC signaling indicating the mapping of the SR configuration indices to the transmission resources.

At 310, the UE determines one or more priority levels associated with the one or more transmission resources. In some examples, the UE determines (e.g., at the MAC layer) the priority level associated with each of the LCHs. For example, the UE may receive RRC signaling indicating the priority levels associated with the LCHs. The UE may determine the priority levels associated with the PHY SR transmission resources based on the priority level associated with the LCH mapped to the transmission resource. For example, the UE may label the priority of the SR configurations based on the LCH with the highest priority among the LCH(s) mapped to the SR configuration. In some examples, the priority levels associated with the SR configurations may be preconfigured (e.g., hardcoded at the UE). The MAC layer may pass the priority level of the SR configurations (e.g., the preconfigured priority level or the priority level determined based on the highest LCH mapped to the SR configuration) to the PHY via an internal tunnel between the MAC and PHY—the implementation of the tunnel may be up to the UE without over-the-air signaling from the BS. For example, the MAC layer passes the priority label of each SR configuration ID via the internal tunnel. Based on the priority levels of the SR configurations (e.g., the preconfigured or determine priority levels), passed from the MAC layer, and the mapping of the SR configurations to the PHY resources (e.g., received via RRC signaling), the PHY can determine the priority of the SR resources. In some examples, a subset of the SR configurations (e.g., SR configuration indices {0, 1, . . . , x}) is associated with a first priority (e.g., a higher priority for URLLC), and the remaining SR configurations (e.g., SR configuration indices {x+1, . . . X}) are associated with a second priority (e.g., a lower priority for eMBB).

At 315, the UE transmits the one or more SRs using the determined transmission resources based on the associated priority levels. In some examples, the UE performs collision handling of the SR(s) with other signals based on the priority of the SR(s). The UE may determine at least one SR transmission collides with at least one other transmission (e.g., on a SR PHY resource). The UE may determine to transmit or drop the SR or the other transmission based on the priority level of the transmission resource for the SR. For example, the UE may transmit the SR and drop the other transmission if (e.g., when) the priority level of the transmission resource for the SR is equal to or greater than a first threshold. The UE may drop the SR and send the other transmission if (e.g., when) the priority level of the transmission resource for the SR is less than the first threshold. In some examples, the UE may piggyback the SR with the other transmission (i.e., send the SR on the resources for the other transmission or multiplex the SR with the other transmission on those resources) if (e.g., when) the priority level of the transmission resource for the SR is equal to or greater than a second threshold and less than the first threshold. The UE may drop the SR and sending the other transmission if (e.g., when) the priority level of the transmission resource for the SR is less than the second threshold.

In some examples, if priority of the SR PHY resource≥threshold A, the UE transmits the SR and drops other (colliding) channels; if the priority of the threshold A>SR PHY resource≥threshold B, the UE piggybacks/multiplexes the SR on other (colliding) channels; and if the priority of the SR PHY resource<threshold B, the UE drops the SR and transmits other (colliding) channels. In some examples, for a simpler approach, if the priority of the SR PHY resource≥threshold A, the UE transmits the SR and drops other (colliding) channels; and if the priority of the SR PHY resource<threshold A, the UE drops the SR and transmits other (colliding) channels or piggybacks/multiplexes SR on the other (colliding) channels.

Figure 4:
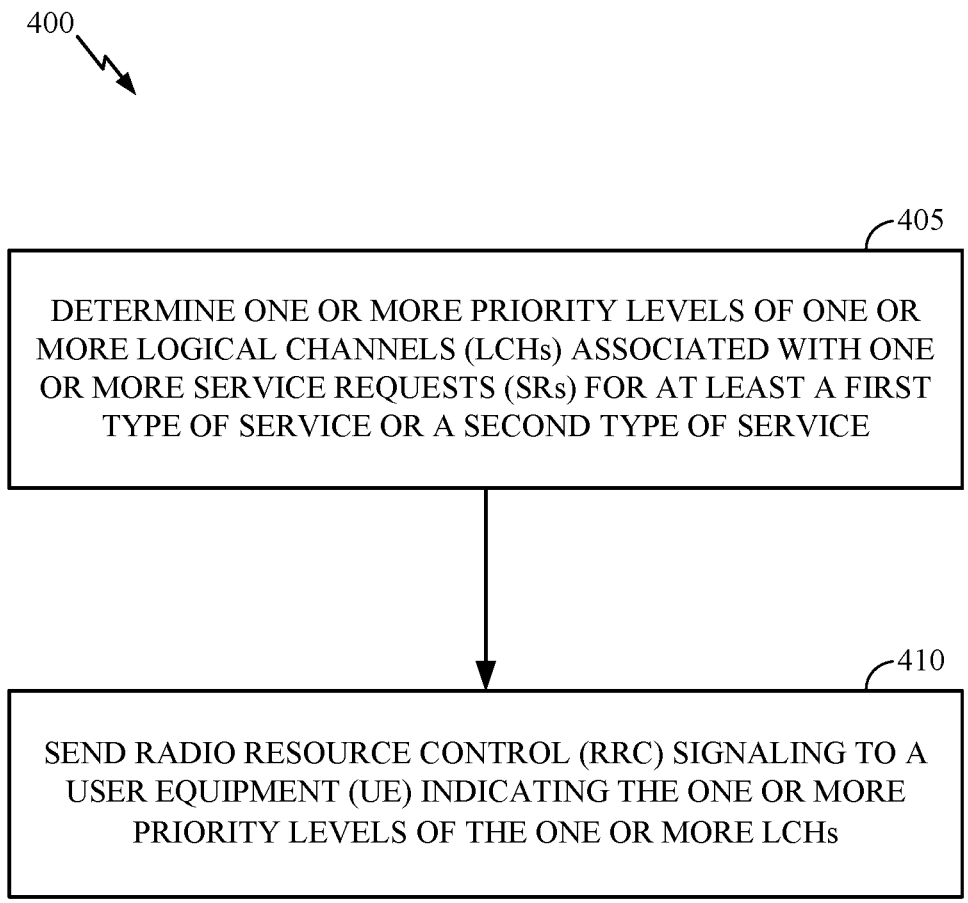
FIG. 4 is a flow diagram illustrating example operations for wireless communication by a base station (BS), in accordance with certain aspects of the present disclosure.

FIG. 4 is a flow diagram illustrating example operations 400 for wireless communication, in accordance with certain aspects of the present disclosure. The operations 400 may be performed, for example, by a BS (e.g., such as the BS 110a in the wireless communication network 100). The operations 400 may be complimentary operations by the BS to the operations 300 performed by the UE. Operations 400 may be implemented as software components that are executed and run on one or more processors (e.g., controller/processor 740 of FIG. 7). Further, the transmission and reception of signals by the BS in operations 400 may be enabled, for example, by one or more antennas (e.g., antennas 734 of FIG. 7). In certain aspects, the transmission and/or reception of signals by the BS may be implemented via a bus interface of one or more processors (e.g., controller/processor 740) obtaining and/or outputting signals.

The operations 400 may begin, at 405, by determining one or more priority levels of one or more LCHs associated with one or more SRs for a first type (e.g., URLLC) of service and/or a second type of service (e.g., eMBB). The one or more priority levels associated with the one or more LCHs may be based on the type of services associated with the LCHs At 410, the BS sends RRC signaling to a UE indicating the one or more priority levels of the one or more LCHs. The BS may also send RRC signaling to the UE indicating a mapping of one or more SR configuration indices to one or more PHY transmission resources.

Figure 5:
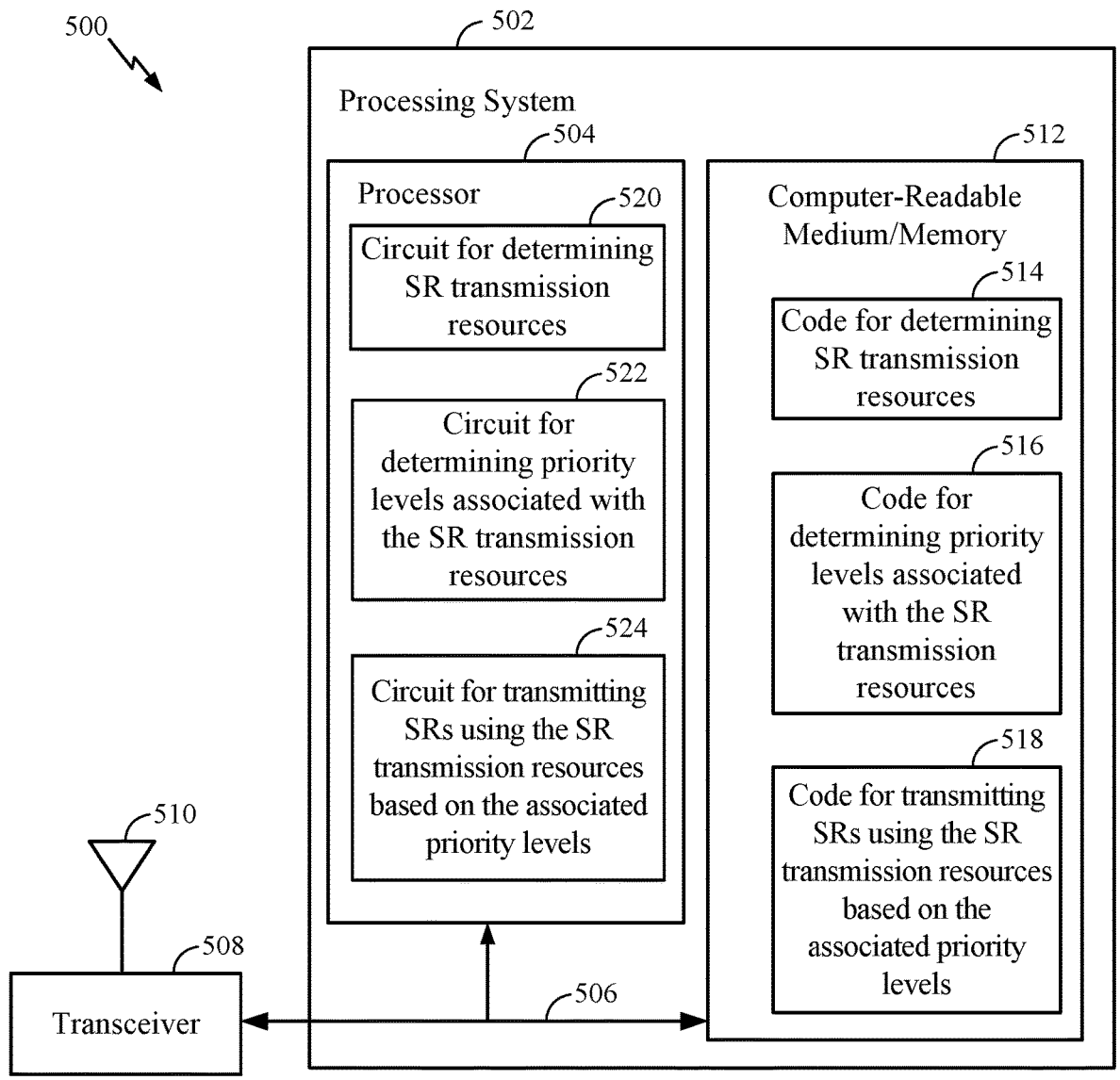
FIG. 5 illustrates a communications device that may include various components configured to perform operations for the techniques disclosed herein, in accordance with aspects of the present disclosure.

FIG. 5 illustrates a communications device 500 that may include various components (e.g., corresponding to means-plus-function components) configured to perform operations for the techniques disclosed herein, such as the operations illustrated in FIG. 3. The communications device 500 includes a processing system 502 coupled to a transceiver 508. The transceiver 508 is configured to transmit and receive signals for the communications device 500 via an antenna 510, such as the various signals as described herein. The processing system 502 may be configured to perform processing functions for the communications device 500, including processing signals received and/or to be transmitted by the communications device 500.

The processing system 502 includes a processor 504 coupled to a computer-readable medium/memory 512 via a bus 506. In certain aspects, the computer-readable medium/memory 512 is configured to store instructions (e.g., computer executable code) that when executed by the processor 504, cause the processor 504 to perform the operations illustrated in FIG. 3, or other operations for performing the various techniques discussed herein for SR prioritization for intra-UE service multiplexing. In certain aspects, computer-readable medium/memory 512 stores code 514 for determining one or more transmission resources for one or more SRs for a first type of service and/or a second type of service, in accordance with aspects of the present disclosure; code 516 for determining one or more priority levels associated with the one or more transmission resources, in accordance with aspects of the present disclosure; and code 518 for transmitting the one or more SRs using the determined one or more transmission resources based on the associated priority levels, in accordance with aspects of the present disclosure. The processor 504 includes circuitry 520 for determining one or more transmission resources for one or more SRs for a first type of service and/or a second type of service, in accordance with aspects of the present disclosure; circuitry 522 for determining one or more priority levels associated with the one or more transmission resources, in accordance with aspects of the present disclosure; and circuitry 524 for transmitting the one or more SRs using the determined one or more transmission resources based on the associated priority levels, in accordance with aspects of the present disclosure.

Figure 6:
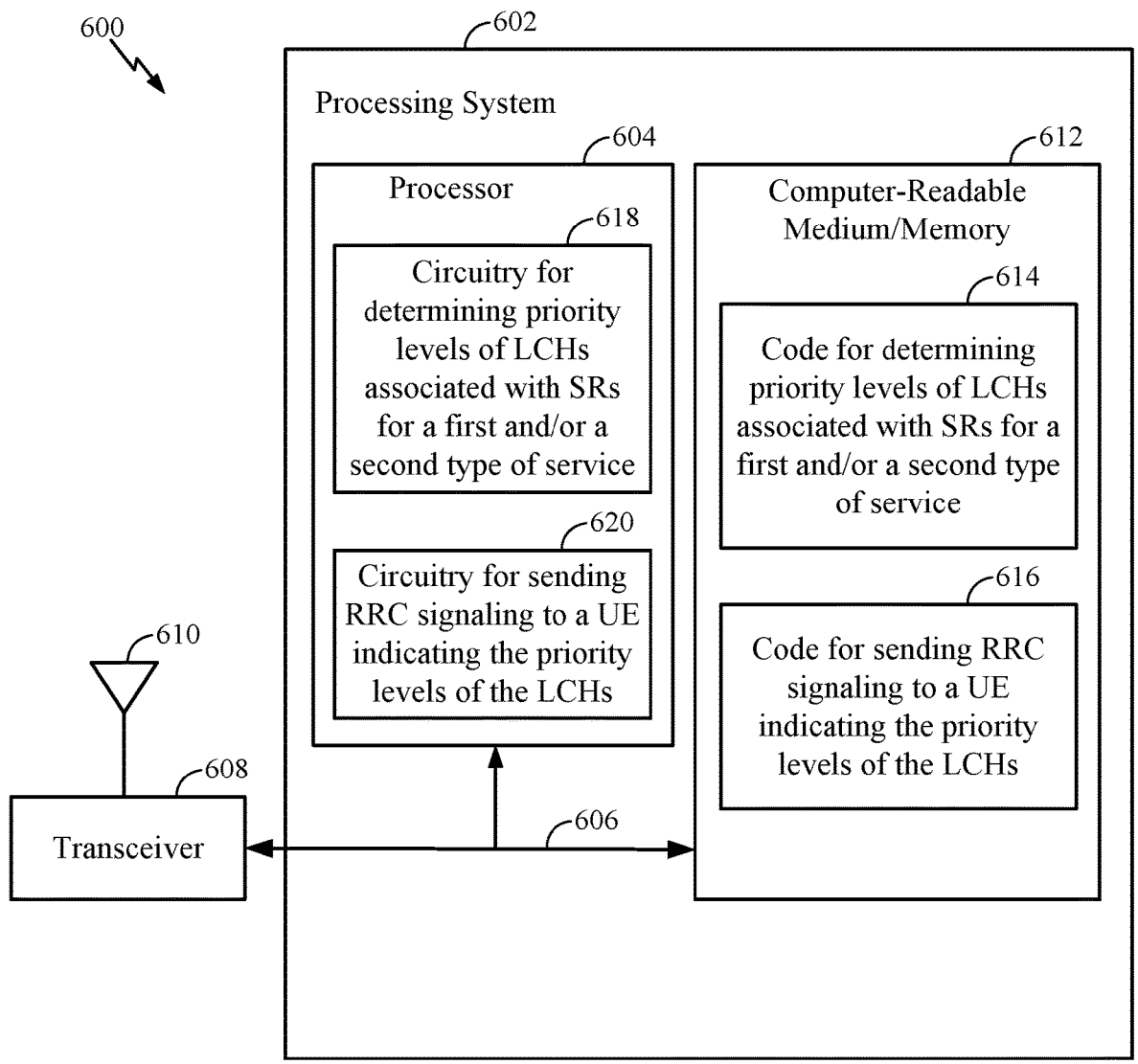
FIG. 6 illustrates a communications device that may include various components configured to perform operations for the techniques disclosed herein, in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 4. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer executable code) that when executed by the processor 604, cause the processor 604 to perform the operations illustrated in FIG. 4, or other operations for performing the various techniques discussed herein for SR prioritization for intra-UE service multiplexing. In certain aspects, computer-readable medium/memory 612 stores code 614 for determining one or more priority levels of one or more LCHs associated with one or more SRs for first and/or a second type of service, in accordance with aspects of the present disclosure; and code 616 for sending RRC signaling to a UE indicating the one or more priority levels of the one or more LCHs, in accordance with aspects of the present disclosure. The processor 604 includes circuitry 618 for determining one or more priority levels of one or more LCHs associated with one or more SRs for first and/or a second type of service, in accordance with aspects of the present disclosure; and circuitry 620 for sending RRC signaling to a UE indicating the one or more priority levels of the one or more LCHs, in accordance with aspects of the present disclosure.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
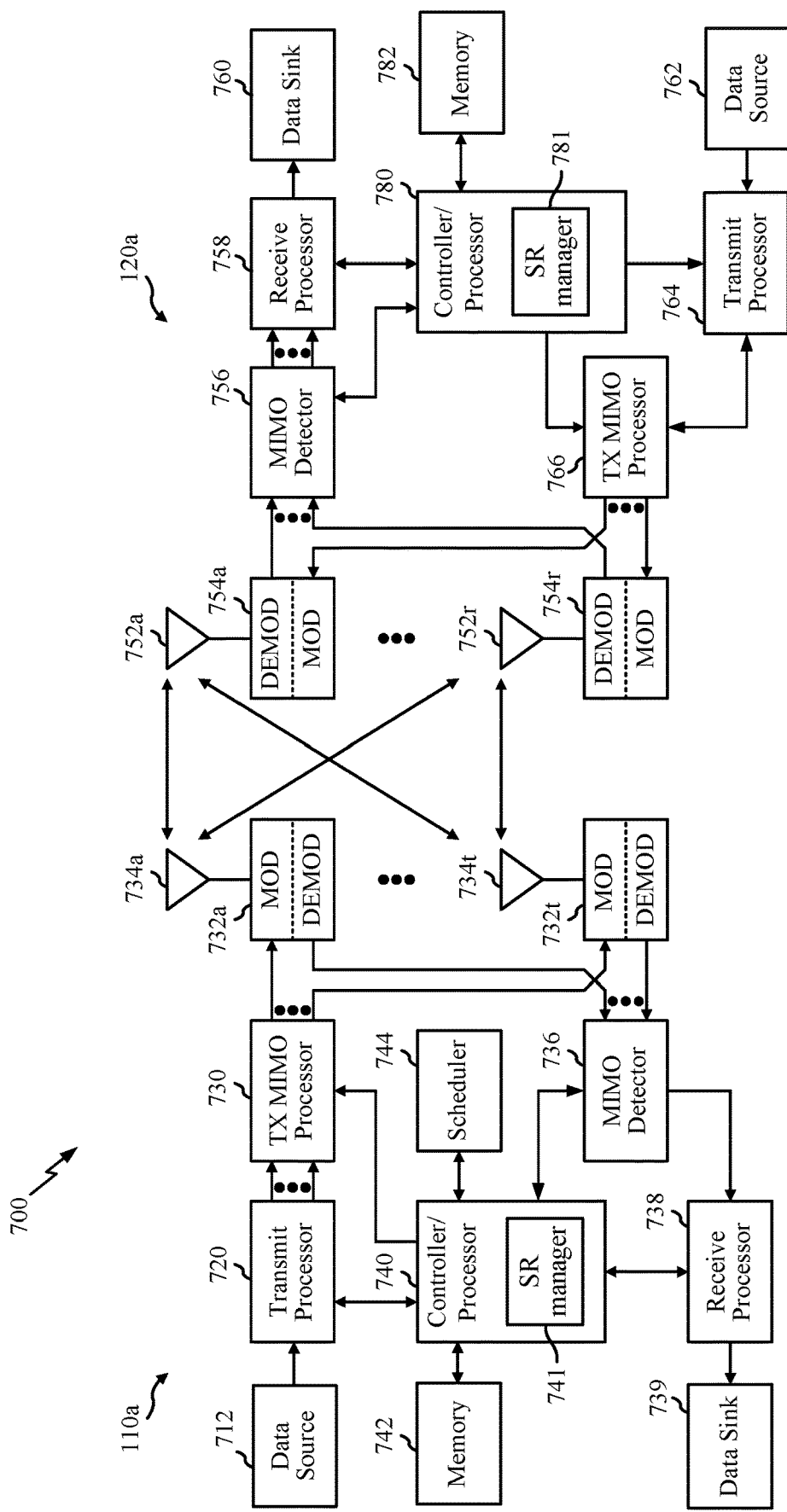
FIG. 7 is a block diagram conceptually illustrating a design of an example BS and UE, in accordance with certain aspects of the present disclosure.

FIG. 7 illustrates example components of BS 110a and UE 120a (as depicted in FIG. 1), which may be used to implement aspects of the present disclosure. For example, antennas 752, processors 766, 758, 764, and/or controller/processor 780 of the UE 120a and/or antennas 734, processors 720, 760, 738, and/or controller/processor 740 of the BS 110a may be used to perform the various techniques and methods described herein for SR prioritization for intra-UE service multiplexing.

At the BS 110a, a transmit processor 720 may receive data from a data source 712 and control information from a controller/processor 740. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 720 may process (e.g., encode and symbol map) the data and control information to obtain data symbols and control symbols, respectively. The processor 720 may also generate reference symbols, e.g., for the primary synchronization signal (PSS), secondary synchronization signal (SSS), and cell-specific reference signal (CRS). A transmit (TX) multiple-input multiple-output (MIMO) processor 730 may perform spatial processing (e.g., precoding) on the data symbols, the control symbols, and/or the reference symbols, if applicable, and may provide output symbol streams to the modulators (MODs) 732a through 732t. Each modulator 732 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 732a through 732t may be transmitted via the antennas 734a through 734t, respectively.

At the UE 120a, the antennas 752a through 752r may receive the downlink signals from the BS 110a and may provide received signals to the demodulators (DEMODs) in transceivers 754a through 754r, respectively. Each demodulator 754 may condition (e.g., filter, amplify, downconvert, and digitize) a respective received signal to obtain input samples. Each demodulator may further process the input samples (e.g., for OFDM, etc.) to obtain received symbols. A MIMO detector 756 may obtain received symbols from all the demodulators 754a through 754r, perform MIMO detection on the received symbols if applicable, and provide detected symbols. A receive processor 758 may process (e.g., demodulate, deinterleave, and decode) the detected symbols, provide decoded data for the UE 120a to a data sink 760, and provide decoded control information to a controller/processor 780.

On the uplink, at UE 120a, a transmit processor 764 may receive and process data (e.g., for the physical uplink shared channel (PUSCH)) from a data source 762 and control information (e.g., for the physical uplink control channel (PUCCH) from the controller/processor 780. The transmit processor 764 may also generate reference symbols for a reference signal (e.g., for the sounding reference signal (SRS)). The symbols from the transmit processor 764 may be precoded by a TX MIMO processor 766 if applicable, further processed by the demodulators in transceivers 754a through 754r (e.g., for SC-FDM, etc.), and transmitted to the BS 110a. At the BS 110a, the uplink signals from the UE 120a may be received by the antennas 734, processed by the modulators 732, detected by a MIMO detector 736 if applicable, and further processed by a receive processor 738 to obtain decoded data and control information sent by the UE 120a. The receive processor 738 may provide the decoded data to a data sink 739 and the decoded control information to the controller/processor 740.

The controllers/processors 740 and 780 may direct the operation at the BS 110a and the UE 120a, respectively. The processor 740 and/or other processors and modules at the BS 110 may perform or direct the execution of processes for the techniques described herein. The memories 742 and 782 may store data and program codes for BS 110a and UE 120a, respectively. A scheduler 744 may schedule UEs for data transmission on the downlink and/or uplink. A UE 120a in the wireless communication network 100 may be configured for multiple services, such as URLLC and eMBB service. As shown in FIG. 7, the Controller/Processor 780 of the UE 120a may have an SR manager 781. The SR manager 781 may be configured to determine transmission resources for SRs for a first type of service (e.g., URLLC) and/or a second type of service (e.g., eMBB), in accordance with aspects of the present disclosure. The SR manager 781 may be configured to determine priority levels associated with the transmission resources and transmit SRs for the first and/or second type of service using the determined transmission resources for the SR based on the associated priority level, in accordance with aspects of the present disclosure. In some examples, the UE 120a may handle collisions with other signals based on the priority of the SR. As shown in FIG. 7, the Controller/Processor 740 of the BS 110a may have an SR manager 112. The SR manager 741 may be configured to determine priority levels of LCHs associated with SRs for a first and/or second type of service, in accordance with aspects of the present disclosure. The SR manager 741 may be configured to send RRC signaling to the UE 120a indicating the priority levels of the LCHs.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 3 and/or FIG. 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE) comprising:
   determining one or more transmission resources for a service request (SR) transmission for a first type of service or a second type of service;
   determining one or more priority levels associated with the one or more transmission resources; and
   when the SR transmission collides with at least one uplink transmission, based on the one or more priority levels associated with the one or more transmission resources:
      transmitting the SR transmission using the determined one or more transmission resources and dropping the at least one uplink transmission when at least one of the one or more priority levels of the one or more transmission resources for the SR transmission is equal to or greater than a first threshold.

2. The method of claim 1, wherein the first type of service is an ultra-reliable low-latency communication (URLLC) service and the second type of service is an enhanced mobile broadband (eMBB) service.

3. The method of claim 1, wherein determining the one or more transmission resources comprises:
   determining a mapping of one or more medium access control (MAC) layer logical channels (LCHs) to one or more SR configuration indices; and
   determining a mapping of the one or more SR configuration indices to one or more physical layer (PHY) transmission resources.

4. The method of claim 3, wherein the mapping of the one or more LCHs to the one or more SR configuration indices is based on the first type of service or the second type of service associated with the LCH.

5. The method of claim 3, wherein determining the mapping of the one or more SR configuration indices to the one or more PHY transmission resources comprises receiving radio resource control (RRC) signaling indicating the mapping of the one or more SR configuration indices to the one more PHY transmission resources.

6. The method of claim 3, wherein determining the one or more priority levels associated with the one or more transmission resources comprises:
   determining a priority level associated with each of the one or more LCHs; and
   determining the one or more priority levels associated with the one or more transmission resources based on the determined priority level associated with each of the one or more LCHs mapped to a given transmission resource.

7. The method of claim 6, wherein determining the one or more priority levels associated with the one or more transmission resources based on the determined priority level associated with each of the one or more LCHs mapped to a given transmission resource comprises:

determining a priority level of the SR configuration index mapped to a given PHY resource based on a highest priority level of the one or more LCHs mapped to that SR configuration index; and determining a priority level of that PHY resource based on the priority level of the SR configuration index.

8. The method of claim 6, further comprising receiving radio resource control (RRC) signaling indicating the one or more priority levels associated with the one or more LCHs.

9. The method of claim 6, wherein the one or more priority levels associated with the one or more LCHs is passed from the MAC layer to the PHY layer via an internal tunnel.

10. A method for wireless communications by a user equipment (UE), comprising:
  determining one or more transmission resources for one or more service requests (SRs) for at least one of: a first type of service or a second type of service;
  determining one or more preconfigured priority levels associated with one or more SR configuration indices;
  determining one or more priority levels associated with the one or more transmission resources based on the preconfigured priority level associated with the SR configuration index mapped to a given transmission resource; and
  transmitting the one or more SRs using the determined one or more transmission resources based on the associated one or more priority levels.

11. The method of claim 10, wherein:
  a subset of the SR configuration indices is associated with a first priority; and
  the remaining SR configuration indices are associated with a second priority, lower than the first priority.

12. The method of claim 1, further comprising, when the SR transmission collides with at least one uplink transmission, based on the one or more priority levels associated with the one or more transmission resources:
  dropping the SR transmission and sending the at least one uplink transmission when the one or more priority levels of the one or more transmission resources for the SR transmission is less than the first threshold.

13. The method of claim 1, further comprising, when the SR transmission collides with at least one uplink transmission, based on the one or more priority levels associated with the one or more transmission resources:
  piggybacking the SR transmission with the at least one uplink transmission when at least one of the one or more priority levels of the one or more transmission resources for the SR transmission is equal to or greater than a second threshold and less than a first threshold; and
  dropping the SR transmission and sending the at least one uplink transmission when the one or more priority levels of the one or more transmission resources for the SR transmission is less than the second threshold.

14. An apparatus for wireless communications, comprising:
  means for determining one or more transmission resources for a service request (SR) transmission for a first type of service or a second type of service;
  means for determining one or more priority levels associated with the one or more transmission resources; and
  means for, when the SR transmission collides with at least one uplink transmission, based on the one or more priority levels associated with the one or more transmission resources:
    transmitting the SR transmission using the determined one or more transmission resources and dropping the at least one uplink transmission when at least one of the one or more priority levels of the one or more transmission resources for the SR transmission is equal to or greater than a first threshold.

15. The apparatus of claim 14, wherein means for determining the one or more transmission resources comprises:
  means for determining a mapping of one or more medium access control (MAC) layer logical channels (LCHs) to one or more SR configuration indices; and
  means for determining a mapping of the one or more SR configuration indices to one or more physical layer (PHY) transmission resources.

16. The apparatus of claim 15, wherein means for determining the mapping of the one or more SR configuration indicates to the one or more PHY transmission resources comprises means for receiving radio resource control (RRC) signaling indicating the mapping of the one or more SR configuration indices to the one more PHY transmission resources.

17. The apparatus of claim 15, wherein means for determining the one or more priority levels associated with the one or more transmission resources comprises:
  means for determining a priority level associated with each of the one or more LCHs; and
  means for determining the one or more priority levels associated with the one or more transmission resources based on the determined one more priority levels associated with the one or more LCHs mapped to a given transmission resource.

18. The apparatus of claim 17, wherein means for determining the one or more priority levels associated with the one or more transmission resources based on the determined one more priority levels associated with the one or more LCHs mapped to a given transmission resource comprises:
  means for determining a priority level of the SR configuration index mapped to a given PHY resource based on a highest priority level of the one or more LCHs mapped to that SR configuration index; and
  means for determining the one or more priority levels of the one or more PHY resources based on the priority level of the SR configuration index.

19. The apparatus of claim 17, further comprising means for receiving radio resource control (RRC) signaling indicating the one or more priority levels associated with the one or more LCHs.

20. An apparatus for wireless communications, comprising:
  means for determining one or more transmission resources for one or more service requests (SRs) for at least one of: a first type of service or a second type of service;
  means for determining one or more preconfigured priority levels associated with one or more SR configuration indices;
  means for determining one or more priority levels associated with the one or more transmission resources based on the preconfigured priority level associated with the SR configuration index mapped to a given transmission resource; and
  means for transmitting the one or more SRs using the determined one or more transmission resources based on the associated one or more priority levels.

21. An apparatus for wireless communications, comprising:
  a memory; and
  at least one processor coupled with a memory and configured to:
    determine one or more transmission resources for a service request (SR) transmission for a first type of service or a second type of service;
    determine one or more priority levels associated with the one or more transmission resources; and
    when the SR transmission collides with at least one uplink transmission, based on the one or more priority levels associated with the one or more transmission resources:
      transmit the SR transmission using the determined one or more transmission resources and drop the at least one uplink transmission when at least one of the one or more priority levels of the one or more transmission resources for the SR transmission is equal to or greater than a first threshold.

22. The apparatus of claim 21, wherein the at least one processor is configured to determine the one or more priority levels associated with the one or more transmission resources, including:
  determining a priority level of an SR configuration index mapped to a given physical layer (PHY) resource based on a highest priority level of one or more logical channels (LCHs) mapped to that SR configuration index; and
  determining the priority level of the PHY resource based on the priority level of the SR configuration index.

23. An apparatus for wireless communications, comprising:
  a memory; and
  at least one processor coupled with a memory and configured to:
    determine one or more transmission resources for one or more service requests (SRs) for at least one of: a first type of service or a second type of service;
    determine one or more preconfigured priority levels associated with one or more SR configuration indices;
    determine one or more priority levels associated with the one or more transmission resources based on the preconfigured priority level associated with the SR configuration index mapped to a given transmission resource; and
    transmit the one or more SRs using the determined one or more transmission resources based on the associated one or more priority levels.

24. A non-transitory computer readable medium having computer executable code stored thereon for wireless communications, comprising:
  code for determining one or more transmission resources for a service request (SR) transmission for a first type of service or a second type of service;
  code for determining one or more priority levels associated with the one or more transmission resources; and
  code for, when the SR transmission collides with at least one uplink transmission, based on the one or more priority levels associated with the one or more transmission resources:
    transmitting the SR transmission using the determined one or more transmission resources and dropping the at least one uplink transmission when at least one of the one or more priority levels of the one or more transmission resources for the SR transmission is equal to or greater than a first threshold.

25. The non-transitory computer readable medium of claim 24, wherein:
  code for determining the one or more transmission resources comprises:
    code for determining a mapping of one or more medium access control (MAC) layer logical channels (LCHs) to one or more SR configuration indices; and
    code for determining a mapping of the one or more SR configuration indices to one or more physical layer (PHY) transmission resources; and
  code for determining the one or more priority levels associated with the one or more transmission resources comprises:
    code for determining a priority level associated with each of the one or more LCHs; and
    code for determining the one or more priority levels associated with the one or more transmission resources based on the determined one more priority levels associated with the one or more LCHs mapped to a given transmission resource.

26. A non-transitory computer readable medium having computer executable code stored thereon for wireless communications, comprising:
  code for determining one or more transmission resources for one or more service requests (SRs) for at least one of: a first type of service or a second type of service;
  code for determining one or more preconfigured priority levels associated with one or more SR configuration indices;
  code for determining one or more priority levels associated with the one or more transmission resources based on the preconfigured priority level associated with the SR configuration index mapped to a given transmission resource; and
  code for transmitting the one or more SRs using the determined one or more transmission resources based on the associated one or more priority levels.

* * * * *